US011328237B2

(12) United States Patent
Bennington et al.

(10) Patent No.: US 11,328,237 B2
(45) Date of Patent: May 10, 2022

(54) END-TO-END COMMODITY AND COMMODITY MARKING TRACKING

(71) Applicant: LENOVO Enterprise Solutions (Singapore) PTE. LTD., New Tech Park (SG)

(72) Inventors: David T. Bennington, Creedmoor, NC (US); JiXiong Chen, New Taipei (TW); Thomas S. Mazzeo, Durham, NC (US); JunWu Sun, ShenZhen (CN)

(73) Assignee: Lenovo Enterprise Solutions (Singapore) PTE. LTD., New Tech Park (SG)

( * ) Notice: Subject to any disclaimer, the term of this patent is extended or adjusted under 35 U.S.C. 154(b) by 791 days.

(21) Appl. No.: 14/501,192

(22) Filed: Sep. 30, 2014

(65) Prior Publication Data

US 2016/0092812 A1    Mar. 31, 2016

(51) Int. Cl.
*G06Q 10/00* (2012.01)
*G06Q 10/06* (2012.01)
*G06Q 10/08* (2012.01)

(52) U.S. Cl.
CPC ..... *G06Q 10/06313* (2013.01); *G06Q 10/087* (2013.01)

(58) Field of Classification Search
CPC ....................... G06Q 10/06313; G06Q 10/087
USPC ....................................................... 705/7.23
See application file for complete search history.

(56) References Cited

U.S. PATENT DOCUMENTS

| 6,442,276 B1 * | 8/2002 | Doljack | G06K 17/00 380/51 |
| 6,547,137 B1 * | 4/2003 | Begelfer | G06Q 10/08 235/385 |
| 7,359,874 B2 * | 4/2008 | Seaman | G06Q 10/06 705/28 |

(Continued)

FOREIGN PATENT DOCUMENTS

WO    2012136138    10/2012

OTHER PUBLICATIONS

Amrik S. Sohal (Computerised parts traceability: an implementation case study, 1997 Elsevier Science Ltd).*

(Continued)

*Primary Examiner* — Hafiz A Kassim
(74) *Attorney, Agent, or Firm* — Kunzler Bean & Adamson; Bruce R. Needham

(57) ABSTRACT

Embodiments of the invention relate to establishing commodity traceability across supplier, manufacturer, and customer processes via end-to-end commodity marking traceability. A manufacturer receives incoming material, such as an industry standard commodity, from a supplier and authenticates a marking affixed to the incoming material. After authenticating the supplier's marking for the incoming material, a second marking is affixed to the incoming material. The commodity is converted at manufacturing into a finished product and associated with finished product data. The supplier's marking and the manufacturer's markings for the incoming material are related, and the relationship is related to the finished product data. The stored and maintained relationships supports integration of the first marking data and the second marking data with product data, and supports end-to-end commodity marking traceability.

20 Claims, 7 Drawing Sheets

(56) References Cited

U.S. PATENT DOCUMENTS

| | | | | |
|---|---|---|---|---|
| 7,380,213 | B2* | 5/2008 | Pokorny | B23Q 35/12 715/764 |
| 8,155,313 | B2 | 4/2012 | Grant | |
| 2003/0069795 | A1* | 4/2003 | Boyd | G06Q 10/087 705/22 |
| 2003/0150908 | A1* | 8/2003 | Pokorny | B23Q 35/12 235/375 |
| 2003/0150909 | A1* | 8/2003 | Markham | B23Q 35/12 235/376 |
| 2004/0003295 | A1* | 1/2004 | Elderfield | G07C 9/00087 713/176 |
| 2005/0045063 | A1* | 3/2005 | Niggemann | B41M 7/0027 106/31.43 |
| 2006/0174129 | A1* | 8/2006 | Brignone | H04L 9/3236 713/181 |
| 2006/0242154 | A1* | 10/2006 | Rawat | G06F 16/168 |
| 2007/0200335 | A1* | 8/2007 | Tuschel | G06K 19/10 283/72 |
| 2007/0219916 | A1* | 9/2007 | Lucas | G06Q 10/08 705/58 |
| 2008/0046263 | A1* | 2/2008 | Sager | G06K 17/00 705/50 |
| 2008/0201262 | A1* | 8/2008 | Saito | G06Q 20/3821 705/50 |
| 2009/0076833 | A1* | 3/2009 | Rizzi | G06Q 30/06 705/1.1 |
| 2012/0109789 | A1* | 5/2012 | Bhatt | G06Q 10/0875 705/29 |
| 2012/0187185 | A1* | 7/2012 | Sayan | G06Q 30/0601 235/375 |
| 2013/0290144 | A1 | 10/2013 | Zmolek | |
| 2013/0346125 | A1* | 12/2013 | Grant | G06Q 10/08 705/7.11 |
| 2015/0379524 | A1* | 12/2015 | Loken | G06Q 30/0185 705/318 |

OTHER PUBLICATIONS

Marjorie A. Lyles, Barbara B. Flynn and Mark T. Frohlich (All Supply Chains Don't Flow Through: Understanding Supply Chain Issues in Product Recalls, Management and Organization Review 4:2 167-182, Blackwell Publishing Ltd, 2008) (Year: 2008).*

Maitri Thakur, and Charles R. Hurburgh (Framework for implementing traceability system in the bulk grain supply chain, ScienceDirect, Journal of Food Engineering (2009) 617-626) (Year: 2009).*

Techane Bosona, Girma Gebresenbet (Food traceability as an integral part of logistics management in food and agricultural supply chain, SciVerseScienceDirect, Food Control 33 (2013) 32-48)) (Year: 2013).*

A. Regattieri, M. Gamberi, and R. Manzini (Traceability of food products: General framework and experimental evidence, ScienceDirect, Journal of Food Engineering (2007) 347-356). (Year: 2007).*

Mohan V. Tatikonda and Gregory N. Stock (Product Technology Transfer in the Upstream Supply Chain, 2003 Product Development & Management Association, J Prod Innov Manag 2003;20:444-467). (Year: 2003).*

Moutaz Khouja (Optimizing inventory decisions in a multi-stage multi-customer supply chain, Transportation Research Part E 39 (2003) 193-208). (Year: 2003).*

G. Fandel, M. Stammen (A general model for extended strategic supply chain management with emphasis on product life cycles including development and recycling, Int. J. Production Economics 89 (2004) 293-308) (Year: 2004).*

John K. Gershenson, G. Jagannath Prasad (Modularity In Product Design For Manufacturability, International Journal of Agile Manufacturing, vol. 1, Issue 1, Aug. 1997). (Year: 1997).*

* cited by examiner

END-TO-END COMMODITY AND COMMODITY MARKING TRACKING

FIELD OF THE INVENTION

The present invention relates to tracking industry commodities. More specifically, the invention efficiently tracks industry standard commodities across a commodity supply chain, including supplier, manufacturer, and customer.

BACKGROUND

Tracking commodities throughout multiple stages of a supply chain are critical for product manufacturers. Product branding manufacturers assign their own unique numeric identifiers to commodities when they purchase parts from suppliers. The identifiers function as a tracking number for the respective commodity. There is no relationship between the supplier and the manufacturer assigned tracking numbers.

It is understood that the product manufacturer creates products containing supplied commodities and delivers the products to a customer. The customer may assign an independent identifier to the received product. Similar to the identifiers provided by the supplier and the manufacturer, the identifiers between the manufacturer and the customer are unrelated. In the event of a product defect or recall at the supplier, manufacturer, or customer, traceability of the commodity purchase history through the product supply chain is challenging. Accordingly, any relationship between the supplier, manufacturer, and customer is difficult to identify when applying, storing, and managing separate and disparate identifiers to a product.

SUMMARY OF THE INVENTION

The present invention relates to a method, system, and computer program product for tracking industry commodities across a supply chain.

In one aspect of the invention, a method is provided to receive material and to authenticate a first applied marking on the received material. Once authentication of the first marking is established, a second marking is applied to the received material. A relationship is created between the markings. Specifically, the relationship connects the first applied marking to the second marking. A second relationship is also created, the second relationship defining a connection between the first relationship and a product, with the product being comprised of at least the received incoming material. With both the first and second relationships created, quality control of the product is improved. Specifically, the second relationship may be used to identify the incoming material.

In another aspect, a system is provided with a server having a processing unit in communication with memory. A functional unit is provided in communication with the processing unit, with a tool supporting tracking and management of received material across a supply chain. A receiving manager functions to receive and authenticate a first applied marking on received material. Following completion of the authentication, a marking manager in communication with the receiving manager marks the received material with a second marking. A connection manager in communication with the marking manager creates a first relationship between the authenticated first marking with the second marking, such that the first relationship connects the first applied marking to the second marking. The connection manager further creates a second relationship between the first relationship and the product, which comprises at least the incoming material. The tool further includes a quality control manager to improve quality control of the product by using the second relationship to identify the incoming material.

In yet another aspect, a computer program product is provided with computer readable storage medium having computer readable program code, which, when executed, causes the computer to implement a method, which returns a tangible product. Instructions are provided to receive material. Instructions are provided to authenticate a first applied marking on the received material. Once authentication of the first marking is established, instructions are provided to apply a second marking to the received material. Instructions are further provided to create a relationship between the first applied marking and the second marking, such that the relationship connects the first applied marking to the second marking. Instructions are provided to create a second relationship between the first relationship and a product. Instructions are further provided to improve quality control of the product by using the second relationship to identify the incoming material.

These and other features and advantages of this invention will become apparent from the following detailed description of the presently preferred embodiments of the invention, taken in conjunction with the accompanying drawings.

BRIEF DESCRIPTION OF THE DRAWINGS

The invention is further illustrated by the following figures with numerical references remaining consistent throughout. None of the figures of the specific embodiments depicted therein is intended to be construed as necessarily limiting the invention defined by the claims.

Figure 1:
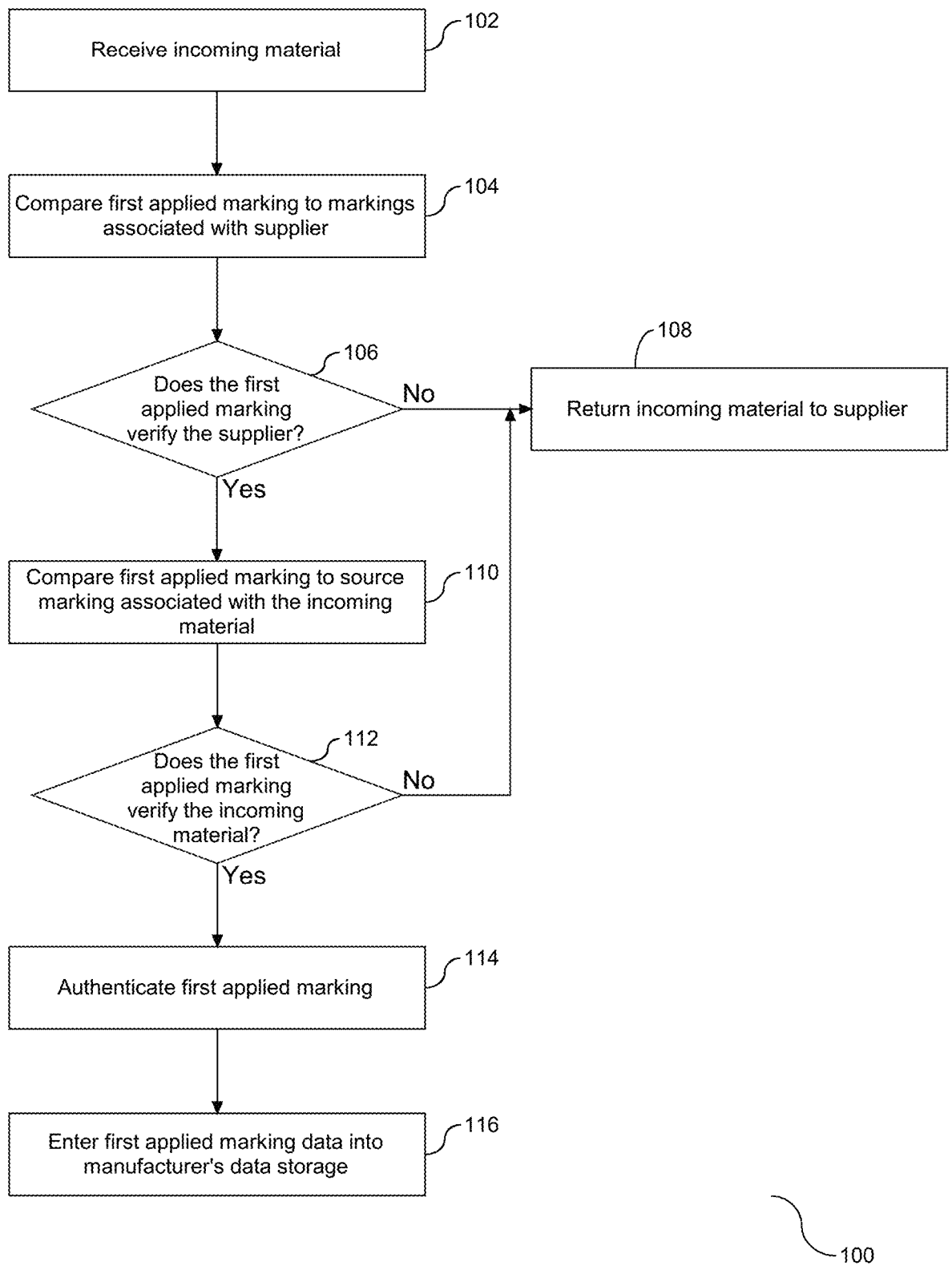
FIG. 1 depicts a flow chart illustrating a process for authenticating incoming material.

The invention and its advantages and benefits are further explained in the detailed description of the invention herein below.

DETAILED DESCRIPTION

It will be readily understood that the components of the present invention, as generally described and illustrated in the Figures herein, may be arranged and designed in a wide variety of different configurations. Thus, the following more detailed description of the embodiments of the apparatus, system, and/or method of the present invention, as presented in the Figures, is not intended to limit the scope of the invention, as claimed, but is merely representative of selected embodiments of the invention.

Reference throughout this specification to "a select embodiment," "one embodiment," or "an embodiment"

means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of markings or indicia to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

As the quantity of suppliers increases, the complexity of supply side tracking increases. The embodiments described herein pertain to end-to-end commodity marking and tracking for any commodity. The source of the commodity may be comprised of a single supplied material or multiple supplied materials from the same supplier or different suppliers. The end-to-end tracking originates with the supplied material, includes all intervening manufacturers and distributors, and concludes with and includes the finished product. Any and all disparate markings are identified and related so that all parties associated with the finished product are identifiable. Marking and relationship data are integrated and maintained in data storage. Accordingly, a relationship in product evolution is established at data storage between one or more originating suppliers, manufacturers, and finished product distributors, which results in improved quality control of the product.

Referring to FIG. 1, a flow chart (100) is provided illustrating a method for authenticating incoming materials. It is understood that this incoming material includes a first marking, also referred to herein as a supplier marking or source marking. In this respect, the first marking identifies the source of the incoming material, as the first marking may be unique to the supplier. In one embodiment, the supplier applies one or more first markings to identify the material. The first marking(s) may include serial numbers, part numbers, supplier codes, manufacturing data codes, or anti-counterfeiting authentication codes. In one embodiment, the first marking is an ink application. Alternatively, the first marking may be applied as a laser etch or label in communication with the supplied material.

In one embodiment, the supplier applies two identifiers to the material, including a numeric identifier for the supplied material, also referred to herein as a part, and barcode marking. In one embodiment, the part identifier may include a product batch number or serial number. The part provided by the supplier may be produced in batches or runs at the same facility or a different facility, and application of the product batch number may provide insight into the origin of the supplied part. The bar code is a machine-readable code in the form of numbers and a pattern of parallel lines of varying widths, printed on and identifying a product. The bar code is configured to be read by a reader, also referred to as a bar code reader or barcode scanner. The reader or scanner is an electronic device for reading printed bar codes. It consists of a light source, a lens, and a light sensor translating optical impulses into electrical pulses. The bar code and associated bar code reader is a tool employed for inventory management. Although a bar code and associated bar code reader are disclosed herein as providing a first marking of the supplied material, in one embodiment, an alternate first marking may be applied. Accordingly, one or two forms of indicia are applied by the supplier to manufacturer received materials for identification, such as source and commodity identification, and inventory control and management.

It is recognized and understood that some standard commodities are easy to counterfeit. These commodities are readily available and specifications are easily accessible. With that in mind, counterfeiters may modify or copy labels of these commodities. Furthermore, commodities that are not proprietary may be manufactured by two or more suppliers, with the different suppliers known for different quality control implementations on the supplied material. As such, some commodities may be subject to defective parts or parts meeting lower quality standards, including tolerances and specifications. Further, some commodity lots may be produced without authorization. Accordingly, tracing a source of the commodity provides insight into the quality of the underlying material.

As discussed above, the first marking identifies the source of the incoming material, or commodity. Further, the first applied marking may be used to evaluate whether the incoming material is counterfeit. To address product standards and provide insight into material quality control of the incoming material, the first marking applied on the incoming material, that is, the supplier's marking assigned to the incoming material, is authenticated.

Authentication of the first applied marking includes a two-step process. The first step of authentication verifies the supplier of the first applied marking and the commodity. As shown in FIG. 1, incoming material is received from a supplier (102). The manufacturer determines whether the first applied marking verifies the source, also referred to herein as the supplier. Specifically, the manufacturer compares the first applied marking to markings associated with the supplier (104). In one embodiment, markings, which uniquely identify the supplier, are maintained and associated with the supplier in the manufacturer's data storage. For example, a manufacturer may maintain data associating suppliers with barcodes applied to incoming materials. When a supplier provides the manufacturer with a standard commodity, the manufacturer scans the barcode applied to the received commodity and compares the barcode to barcodes associated with the supplier in the manufacturer's data storage. The manufacturer determines whether the comparison at step (104) verifies the supplier, specifically, whether the first applied marking verifies the supplier (106). If the first applied marking does not verify the supplier as the supplier of the incoming material, the incoming material is returned to the supplier (108).

If the first applied marking verifies the supplier as the supplier of the incoming material, the manufacturer compares the first applied marking on the incoming material to a source marking associated with the incoming material (110). That is, the second step of authentication verifies the incoming material marked with the first applied marking to identify counterfeit incoming material. In one embodiment, the supplier provides a list of indicia to authenticate the supplier's commodities, as received by the manufacturer. In another embodiment, the supplier provides the manufacturer with access to a supplier marking database for the subject product(s). The manufacturer determines whether the comparison at step (110) verifies the incoming material, specifically, whether the first applied marking verifies the incoming material (112). If the first applied marking does not verify the incoming material, the incoming material is returned to the supplier (108). If the first applied marking verifies the incoming material as the material supplied by the supplier, the first applied marking is authenticated (114). The first applied marking data is entered into the manufacturer's data storage (116). Capturing the authenticated first applied marking data in data storage enables traceability of the first applied marking through the supply chain for a product comprising at least the incoming material.

As noted, the authentication process disclosed herein is two-fold, with a first step of authentication considering whether the incoming material is received from the supplier, as planned, and a second step of authentication considering whether the commodity is the commodity supplied by the supplier or counterfeit. Accordingly, authentication enables the manufacturer to evaluate the quality of the incoming material before converting the incoming material to a finished product.

Figure 2:
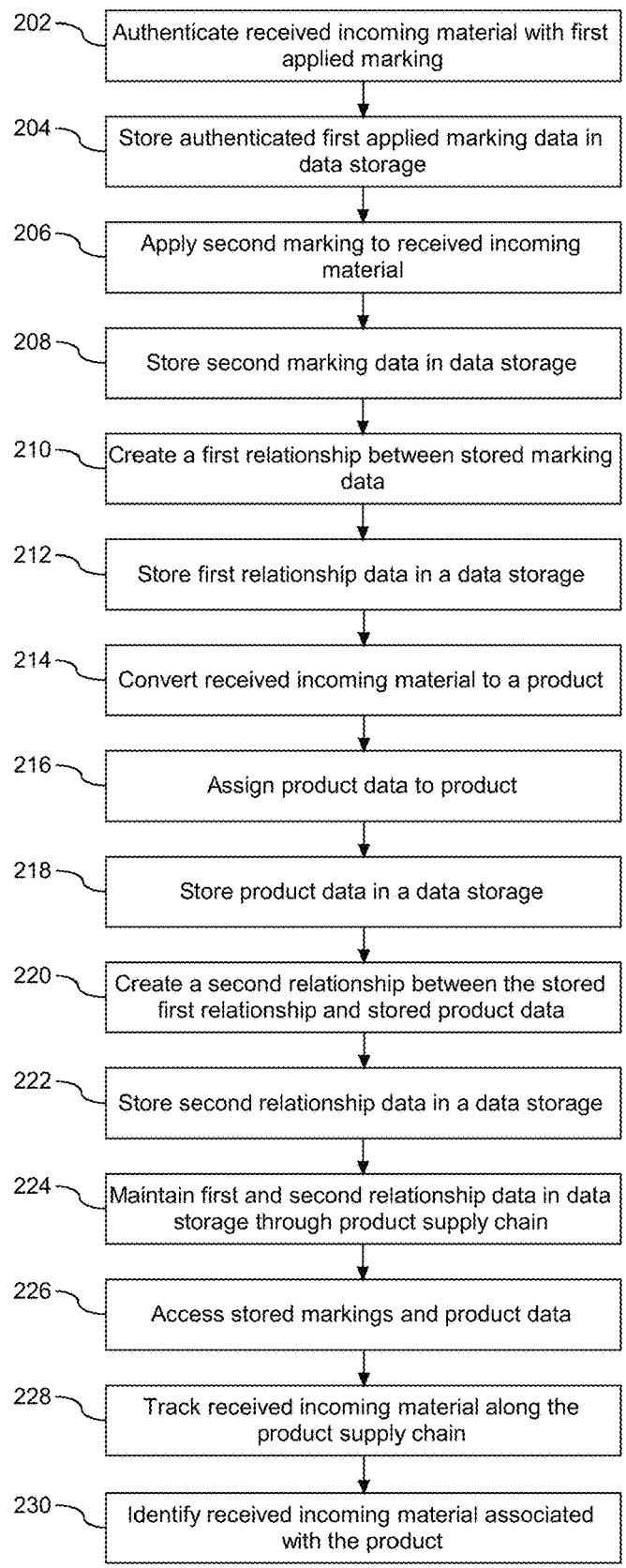
FIG. 2 depicts a flow chart illustrating a process for tracking incoming material using stored relationship data.

Referring to FIG. 2, a flow chart (200) is provided illustrating a method for tracking incoming material using stored relationship data. More specifically, the process shown and described in FIG. 2 illustrates a process for enabling traceability of supplier components that comprise a manufactured product. The first applied marking on the received incoming material is authenticated (202). Once the first applied marking is authenticated, the first applied marking data of the authenticated material is stored in data storage (204). A second marking, also referred to herein as a manufacturer marking, is applied to the received incoming material (206). Specifically, if the first applied marking on the incoming material is authenticated as the source marking associated with the incoming material, the manufacturer applies a second marking to the received incoming material. The second marking serves to verify the first marking authentication. In addition, the second marking serves as a manufacturer's identification of the supplied material. Similar to the first applied marking, the second marking may take the form of one or more serial numbers or part numbers. Alternatively, the second marking may take the form of a supplier code, manufacturing date code, or anti-counterfeiting authentication code. Regardless of the form, and similar to the first applied marking data, second marking data is stored in data storage (208). Accordingly, the applied and stored second marking serves two functions, authentication verification and manufacturer side identification.

Manufacturers may modify their manufacturing process to support the supplier's markings on incoming material. However, this approach may increase the cost and decrease the efficiency of the manufacturing process, which now includes at least one additional scanning process step. For instance, bar code readers are an additional expense, and if the supplier does not mark the incoming material with bar codes, the process must support an alternative or non-standard quality control steps. Manufacturers assign their own unique part numbers to commodities when they purchase or otherwise receive industry standard parts from suppliers. Specifically, a product manufacturer may print a part number on a label separate from the first marking on the incoming material. If the label is not securely attached to the incoming material, no traceable relationship is apparent between the supplier of the incoming material and the product manufacturer markings. Accordingly, the present method comprises a first marking on incoming material and a second marking on the commodity, together with formulating a relationship between the two markings.

The method further provides for creating data relationships. A first relationship is created between the stored first applied marking data and the stored second marking data (210). In one embodiment, the first relationship comprises connecting or otherwise associating the authenticated first marking to the second marking—that is, the supplier's applied marking on the incoming material is linked to or connected with the manufacturer's marking on the same material (210). This connecting, or linking, in essence, creates the first relationship between the two markings that enables "upstream" traceability in addition to "downstream" traceability. In one embodiment, a manufacturing floor system is used to collect and then link both the first and second markings. In other words, the connection creates a first relationship at the marking data level. The first relationship data is stored in data storage along with the first applied marking data and the second marking data (212). Accordingly, in view of this stored first relationship, the supplier tracking information for an industry standard commodity is related to the manufacturer's tracking information for the same commodity.

Both the first and the second markings are applied to the received incoming material. The received incoming material, including these markings, is converted to a product (214). In one embodiment, the product may include a plurality of incoming materials from one or more suppliers. Following the conversion at step (214), product data is assigned to the finished product (216). Finished product data may include, for instance, shipping, lot, and process data. Using finished product data only, current industry labeling approaches focus on traceability of a product to a customer, and merely provide traceability in-house or after shipment. The finished product data is stored in data storage (218).

Maintaining traceability of industry standard commodities both upstream and downstream of a manufacturing process requires relating upstream and downstream data for the commodity. In one embodiment, a second relationship is created between the stored first relationship and the stored finished product data (220). In one embodiment, the second relationship develops as a manufacturing barcode, also referred to herein as a second marking, is associated with finished product serial number data. As discussed above, the first relationship data, including the manufacturer's barcode, are stored in data storage (212). The finished product serial number is also stored in data storage (218). Further, the second relationship data, comprising the first relationship data and the finished product serial number data, are also stored in data storage (222). Accordingly, the first and second relationships connect the supplier to the manufacturer, and the manufacturing process to the finished product at the marking data and finished product data levels.

Data storage stores the first and second relationships, including the first relationship data and the second relationship data, as shown in steps (212) and (222). Storing the relationship data inherently means that data storage stores the first marking data, second marking data, product data, and the first relationship and second relationship data. The integrated first and second relationship data is maintained through a supply chain for the product (224). In view of the integrated, maintained, and stored relationships and associated data, the first applied marking data, the second marking data, and the product data is accessible in data storage from multiple points along the product supply chain (226). This integration enables upstream and downstream traceability for the product, which supports efficient access to the data in data storage. In one embodiment, the relationship data is maintained in and accessible from a data storage system, for instance, a manufacturer's data server in communication with a client site database and a manufacturer's database. To that end, the stored relationships improve data searching and accessing efficiency because the integration of the first applied marking data, the second marking data, and the product data into the stored first and second relationship data necessarily simplifies searching for first marking data in view of finished product data.

As a result of the data storage strategy that generates the first and second relationships, the received incoming material associated with the product material may be efficiently tracked in data storage through the product supply chain (228). Further, the received incoming material associated with the product is identifiable in view of the stored relationships (230). Accordingly, the integrated, maintained, and stored relationship data, which supports efficient access to first applied marking data, second marking data, and product data, enables efficient tracking and identification of the received incoming material.

Accordingly, the method provides for industry standard commodity traceability, both upstream and downstream of manufacturing by storing relationships between supplier's tracking information for an industry standard commodity and manufacturer's tracking information for the same commodity, and storing relationships between this tracking information and converted product data.

Figure 3:
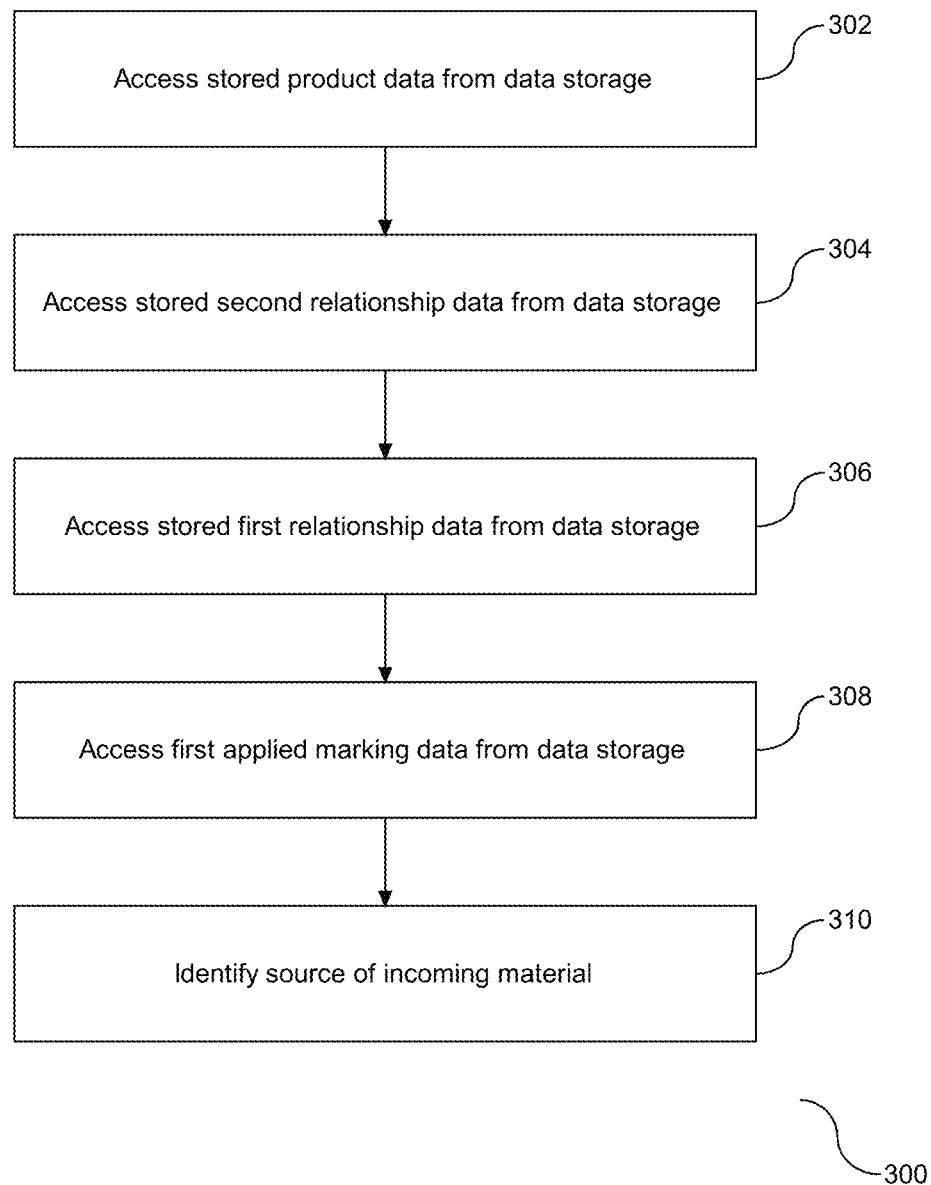
FIG. 3 depicts a flow chart illustrating a process for identifying a source of incoming material.

The relationships created between the incoming material and manufactured product, as shown in FIG. 2, support accessing either first or second marking data or product data. Referring to FIG. 3, a flow chart (300) is provided illustrating one embodiment for identifying a source of incoming material. As shown in FIG. 3, stored product data is accessed from data storage (302). Through the integration of the product data and the first relationship data, accessing the stored product data provides access to the stored second relationship data (304). Additionally, in view of the stored second relationship data, accessing the stored second relationship data provides access to the stored first relationship data (306). Through the integration of the first and second marking data, accessing the stored first relationship data provides access to the stored second marking data and to the stored first applied marking data (308). As the first applied marking is a supplier provided indicia, which is unique to the supplier, accessing the first applied marking data identifies the source of the incoming material (310).

For example, a customer may require service on an industry standard commodity, which comprises a manufactured finished product. The finished product serial number is found in a service database at the customer site. In view of the created, stored, and maintained first and second relationships data, the service database also identifies the manufacturer barcode for the finished product and the supplier barcode for the industry standard commodity comprising the manufactured finished product. In one embodiment, the supplier is identified based on the stored first applied marking, comprising, for instance, a barcode and supplier name. In this respect, the stored relationships enable the customer to efficiently access the supplier information, which improves quality control of the product. Accordingly, in view of the integrated storing of the first applied marking data, the second marking data, and the product data, along with the stored first and second relationship data, the source of the authenticated first marking is accessible from data storage when the second marking or the finished product data are accessed from data storage.

As demonstrated in the flow charts of FIGS. 1-3, methods are employed to support end-to-end traceability of industry standard commodities. More specifically, a first relationship is created between supplier and manufacturer markings on a commodity, and the relationship comprises connecting the supplier marking data and manufacturer marking data. The second relationship is created between the first relationship and the finished product, including data associated with the finished product, which includes at least the supplied commodity. The separate marking data, as connected, and the product data, as related to the connected marking data, are stored in data storage. In one embodiment, tools support the traceability of the commodities, including receiving the supplier's incoming material, authenticating the supplier's marking on the incoming material, connecting the authenticated supplier's marking with a manufacturer's marking, relating the connected markings with finished product data, and storing the relationship data.

Figure 4:
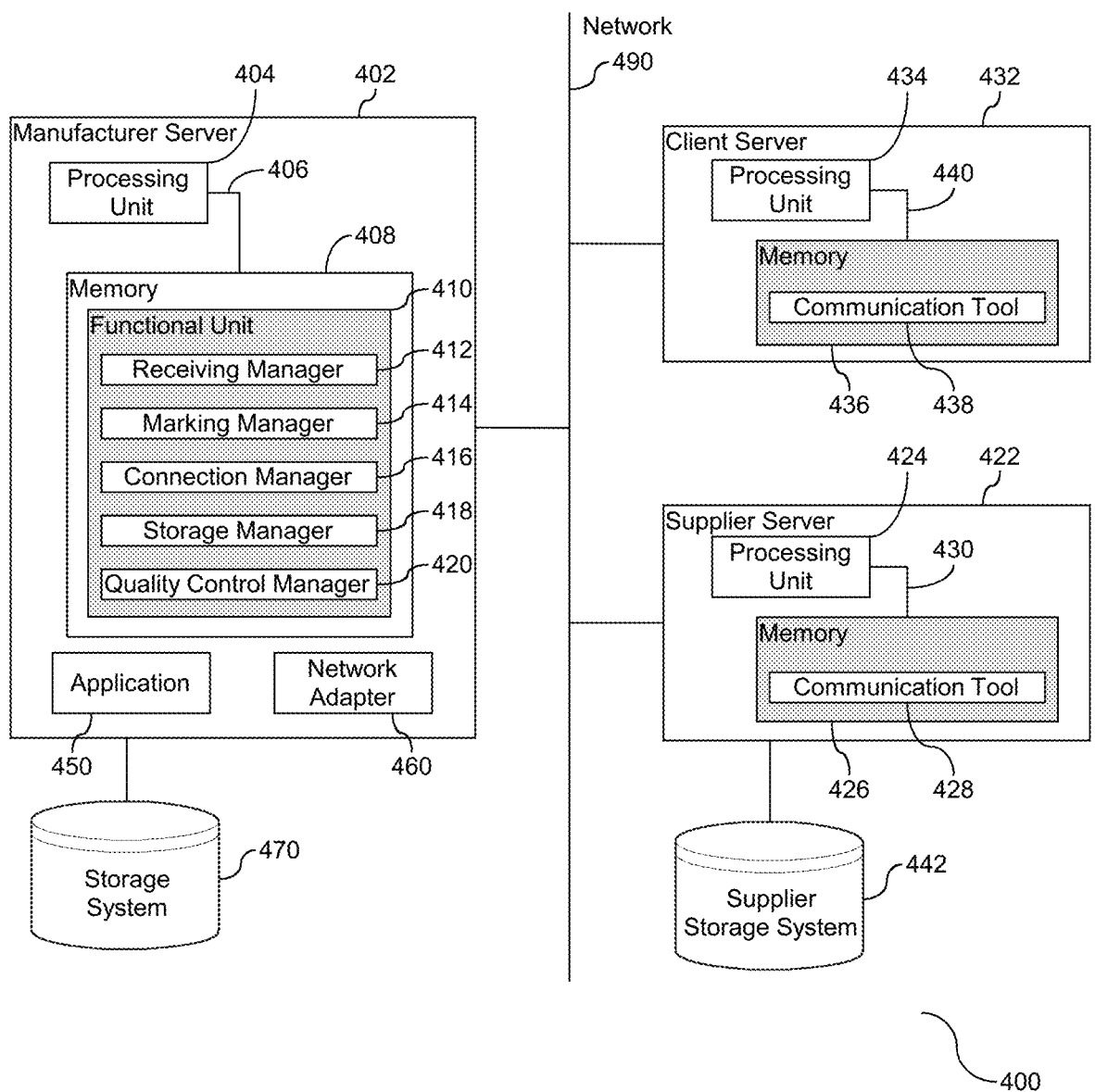
FIG. 4 depicts a block diagram illustrating tools embedded in a computer system to support commodity and finished product traceability.

Referring to FIG. 4, a block diagram (400) is provided illustrating one or more tools embedded in a computer system to support the traceability of industry standard commodities as described above. More specifically, a shared pool of configurable computer resources is shown with a manufacturer server (402), a supplier server (422), and a client server (432). Although only three servers are shown in the example herein, the invention should not be limited to this quantity of servers in the computer system. Accordingly, any number of servers may be employed to support end-to-end traceability of industry standard commodities.

Servers in the system are in communication with data storage. More specifically, the manufacturer server (402) has a processing unit (404) in communication with memory (408) across a bus (406). Server (402) is shown in communication with data storage (470), and also in communication with a network (490) via a network adapter (460). The memory (408) is in communication with a functional unit (410). The supplier server (422) has a processing unit (424) in communication with memory (426) across a bus (430) and in communication with data storage (442), also referred to herein as supplier storage. In addition, the memory (426) is in communication with a communication tool (428). The client server (432) has a processing unit (434) in communication with memory (436) across a bus (440). In addition, the memory (436) is in communication with a communication tool (438).

As shown herein, an application (450) processes tracking requests local to the manufacturer server (402). Several tools are provided to support traceability of marking and product data between the manufacturer server (402), the supplier server (422), and the client server (432). More specifically, the functional unit (410) is provided local to the manufacturer server (402) in a shared pool of resources and in communication with memory (408). The functional unit (410) manages the tools that support commodity traceability. The tools include, but are not limited to, a receiving manager (412), a marking manager (414), a connection manager (416), a storage manager (418), and a quality control manager (420). The receiving manager (412) functions to receive incoming material, which in one embodiment is received from a supplier. The receiving manager (412) further functions to authenticate the first applied marking of the incoming material against supplier provided indicia. Accordingly, the receiving manager (412) functions to prevent incoming counterfeit material from entering a manufacturing process.

The communication tool (428) is provided to support the receiving manager (412). The communication tool (428) manages communication of marking information for incoming materials from the supplier server (422) to the manufacturer server (402).

As described above, incoming material is received and authenticated. The marking manager (414), which is provided in communication with the receiving manager (412), functions to mark the incoming material with a second marking, also referred to herein as a manufacturer's marking. In one embodiment, the second marking is applied in response to authentication of the first marking, also referred to herein as the source marking. After application of the second marking is complete, the connection manager (416) functions to create a first relationship between the first applied marking data and the second marking data. The first relationship connects and integrates the first marking data with the second marking data. The connection manager (416) further functions to create a second relationship between the first relationship data and product data. Once the first and second relationships have been established, the storage manager (418) functions to store and maintain the first relationship data and second relationship data in the manufacturer storage system (470), with the first relationship data including the first applied marking data and the second marking data, and the second relationship data including first relationship data and product data. Accordingly, the connection manager (416) associates the first applied marking data, second marking data, and product data as it integrates first and second relationship data, and the storage manager (418) stores the first applied marking data, second marking data, product data, and integrates relationship data in the manufacturer data storage (470).

The quality control manager (420) functions to improve quality control of the finished product by using the stored and maintained relationship data in the manufacturer storage system (470). Specifically, the quality control manager (420) identifies incoming material, including identification of the source of the incoming material converted into the finished product.

As shown, a communication tool (438) is provided local to the client server (432) and in communication with memory (436) of the client server (432). The communication tool (438) manages to communicate relationship data for converted incoming materials to the client server (432). Accordingly, the communication tool (438) functions to maintain the relationships between the disparate information associated with the supplier material and the manufacturer product, so that the source of the finished product is ascertainable from the client server (432).

As shown, the managers (412)-(420), and tools (428) and (438), are shown distributed in the shared pool of configurable computer resources, i.e. cloud. In the example shown herein, the managers (412)-(420) are local to the manufacturer server (402). In one embodiment, neither the supplier server (422) nor the client server (432) requires any additional tools for computer program code to support traceability of industry standard commodities. As identified above, managers (412)-(420), respectively, are shown residing in memory (408) of the manufacturer server (402). Although in one embodiment, the managers (412)-(420), respectively, may individual or collectively reside as hardware tools external to memory (408) of manufacturer server (402), or they may be implemented as a combination of hardware and software. Similarly, in one embodiment, the managers (412)-(420) may be combined into a single functional item that incorporates the functionality of the separate items. As shown herein, each of the manager(s) are shown local to one data center. However, in one embodiment they may be collectively or individually distributed across the shared pool of configurable computer resources and function as a unit to store, maintain, and manage related marking and product data to enable efficient tracking of commodity sources in a manufacturing chain. Accordingly, the managers may be implemented as software tools, hardware tools, or a combination of software and hardware tools.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
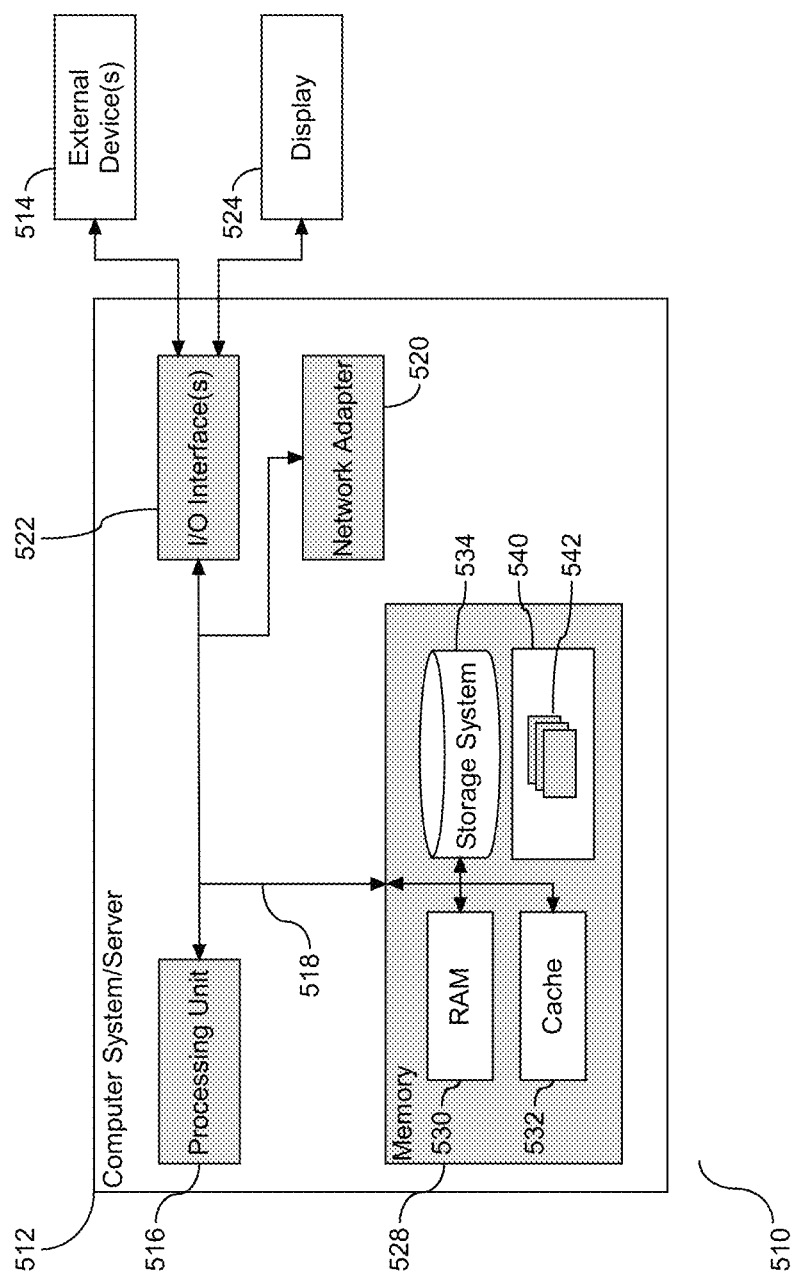
FIG. 5 depicts a cloud computing node according to an embodiment of the present invention.

As described herein, the method and system to support commodity tracking across the supply chain may be embodied in a shared pool of resources, also referred to herein as a cloud computing environment. In one embodiment, the cloud computing environment is service oriented with a focus on statelessness, low coupling, modularity, and semantic interoperability. At the heart of cloud computing is an infrastructure comprising a network of interconnected nodes. Referring now to FIG. 5, a schematic of an example of a cloud computing node is shown. Cloud computing node (510) is only one example of a suitable cloud computing node and is not intended to suggest any limitation as to the scope of use or functionality of embodiments of the invention described herein. Regardless, cloud computing node (510) is capable of being implemented and/or performing any of the functionality set forth hereinabove. In cloud computing node (510) there is a computer system/server (512), which is operational with numerous other general purpose or special purpose computing system environments or configurations. Examples of well-known computing systems, environments, and/or configurations that may be suitable for use with computer system/server (512) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server (512) may be described in the general context of computer system-executable instructions, such as program modules, being executed by a computer system. Generally, program modules may include routines, programs, objects, components, logic, data structures, and so on that perform particular tasks or implement particular abstract data types. Computer system/server (512) may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server (512) in cloud computing node (510) is shown in the form of a general-purpose computing device. The components of computer system/server (512) may include, but are not limited to, one or more processors or processing units (516), a system memory (528), and a bus (518) that couples various system components including system memory (528) to processor (516). Bus (518) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server (512) typically includes a variety of computer system readable media. Such media may be any available media that is accessible by computer system/server (512), and it includes both volatile and non-volatile media, removable and non-removable media.

System memory (528) can include computer system readable media in the form of volatile memory, such as random access memory (RAM) (530) and/or cache memory (532). Computer system/server (512) may further include other removable/non-removable, volatile/non-volatile computer system storage media. By way of example only, storage system (534) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (518) by one or more data media interfaces. As will be further depicted and described below, memory (528) may include at least one program product having a set (e.g., at least one) of program modules that are configured to carry out the functions of embodiments of the invention.

Program/utility (540), having a set (at least one) of program modules (542), may be stored in memory (528) by way of example, and not limitation, as well as an operating system, one or more application programs, other program modules, and program data. Each of the operating systems, one or more application programs, other program modules, and program data or some combination thereof, may include an implementation of a networking environment. Program modules (542) generally carry out the functions and/or methodologies of embodiments of the invention as described herein.

Computer system/server (512) may also communicate with one or more external devices (514), such as a keyboard, a pointing device, a display (524), etc.; one or more devices that enable a user to interact with computer system/server (512); and/or any devices (e.g., network card, modem, etc.) that enable computer system/server (512) to communicate with one or more other computing devices. Such communication can occur via Input/Output (I/O) interfaces (522). Still yet, computer system/server (512) can communicate with one or more networks such as a local area network (LAN), a general wide area network (WAN), and/or a public network (e.g., the Internet) via network adapter (520). As depicted, network adapter (520) communicates with the other components of computer system/server (512) via bus (518). It should be understood that although not shown, other hardware and/or software components could be used in conjunction with computer system/server (512). Examples, include, but are not limited to: microcode, device drivers, redundant processing units, external disk drive arrays, RAID systems, tape drives, and data archival storage systems, etc.

Figure 6:
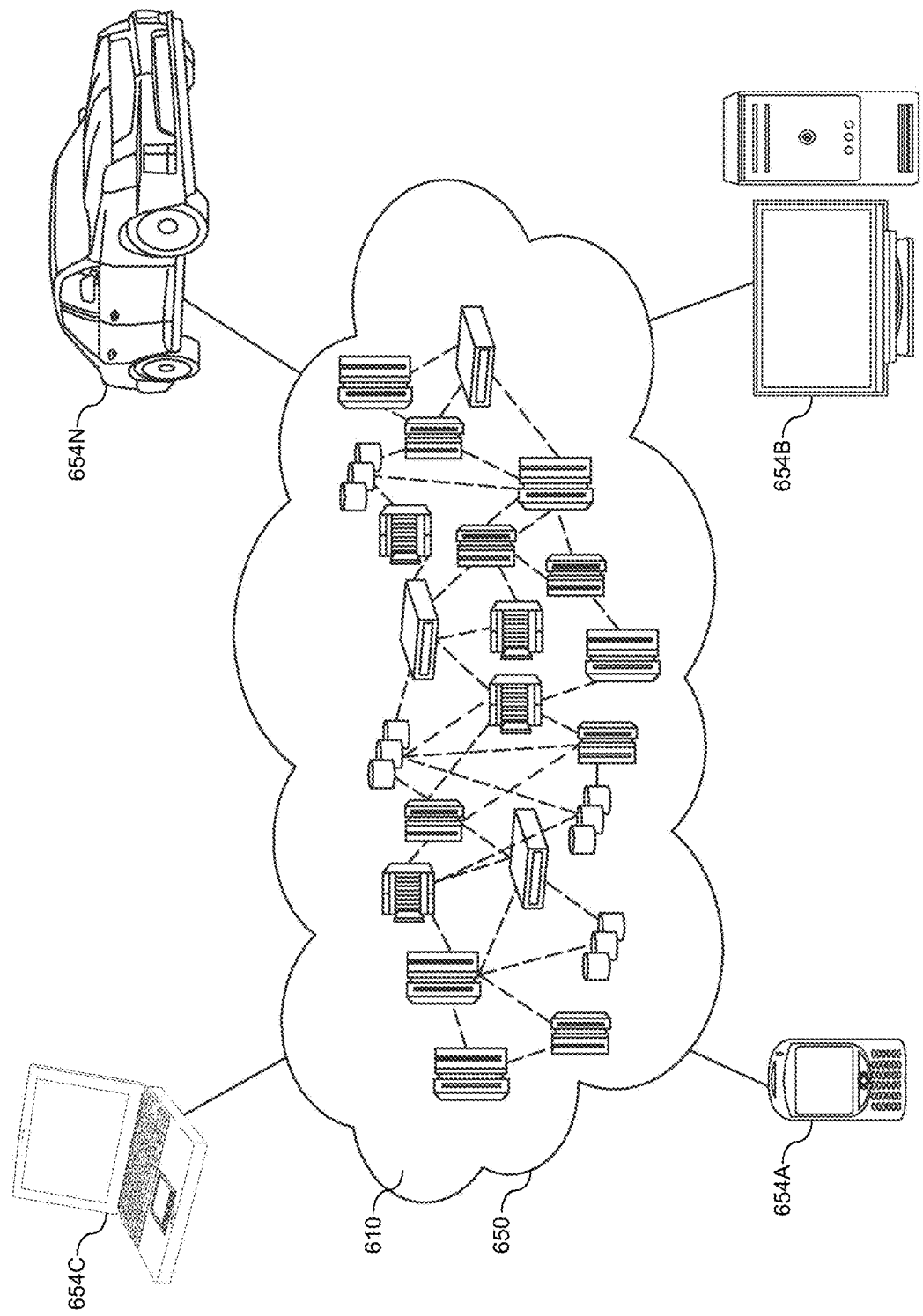
FIG. 6 depicts a cloud computing environment according to an embodiment of the present invention.

Referring now to FIG. 6, illustrative cloud computing environment (650) is depicted. As shown, cloud computing environment (650) comprises one or more cloud computing nodes (610) with which local computing devices used by cloud consumers, such as, for example, personal digital assistant (PDA) or cellular telephone (654A), desktop computer (654B), laptop computer (654C), and/or automobile computer system (654N) may communicate. Nodes (610) may communicate with one another. They may be grouped (not shown) physically or virtually, in one or more networks, such as Private, Community, Public, or Hybrid clouds as described hereinabove, or a combination thereof. This allows cloud computing environment (650) to offer infrastructure, platforms and/or software as services for which a cloud consumer does not need to maintain resources on a local computing device. It is understood that the types of computing devices (654A)-(654N) shown in FIG. 6 are intended to be illustrative only and that computing nodes (610) and cloud computing environment (650) can communicate with any type of computerized device over any type of network and/or network addressable connection (e.g., using a web browser).

Figure 7:
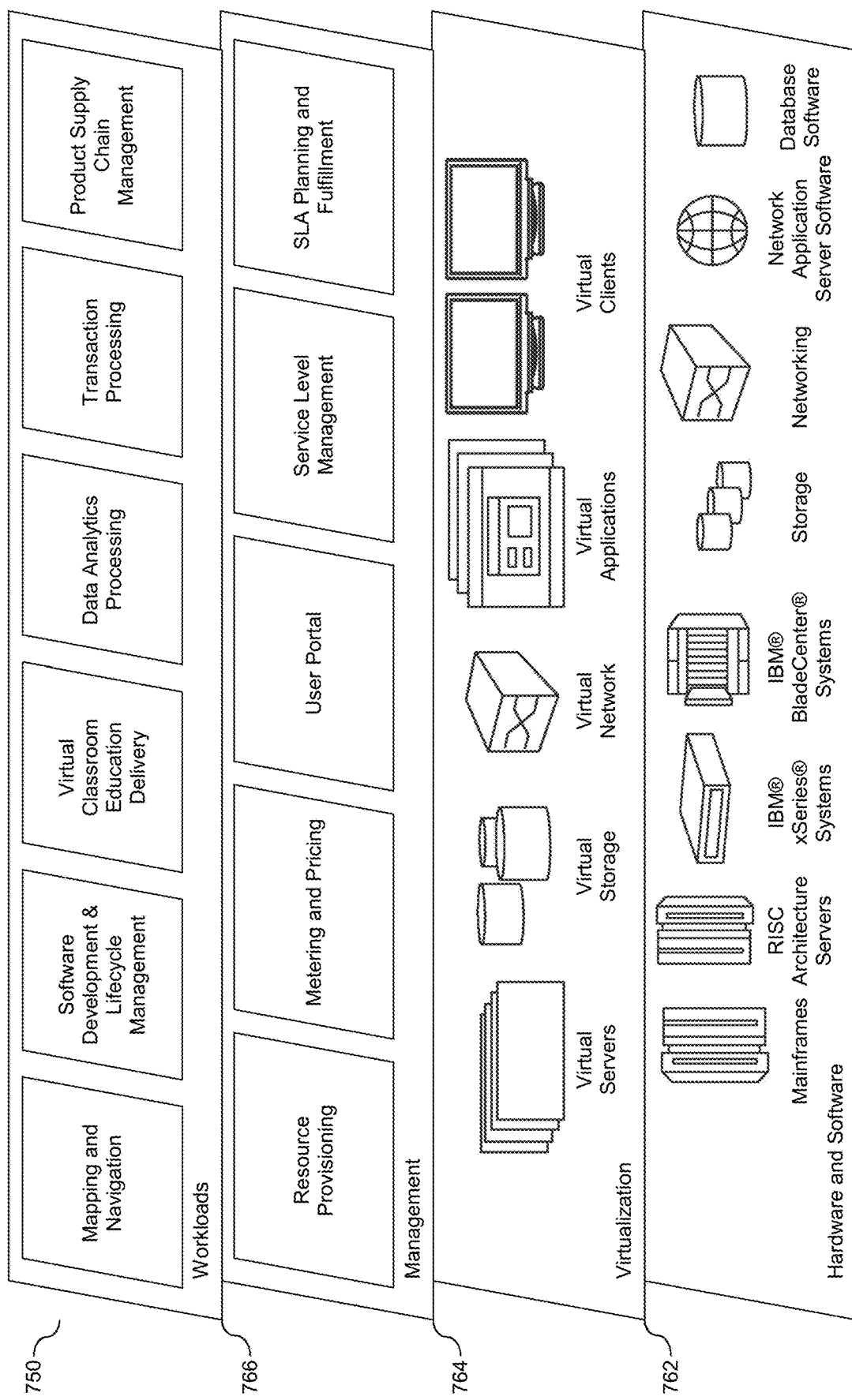
FIG. 7 depicts abstraction model layers according to an embodiment of the present invention.

Referring now to FIG. 7, a set of functional abstraction layers provided by cloud computing environment (750) is shown. It should be understood in advance that the components, layers, and functions shown in FIG. 7 are intended to be illustrative only and embodiments of the invention are not limited thereto. As depicted, the following layers and corresponding functions are provided: hardware and software layer (760), virtualization layer (762), management layer (764), and workload layer (766). The hardware and software layer (760) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (762) provides an abstraction layer from which the following examples of virtual entities may be provided: virtual servers; virtual storage; virtual networks, including virtual private networks; virtual applications and operating systems; and virtual clients.

In one example, management layer (764) may provide the following functions: resource provisioning, metering and pricing, user portal, service level management, and SLA planning and fulfillment. The functions are described below. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer (766) provides examples of functionality for which the cloud computing environment may be utilized. Examples of workloads and functions which may be provided from this layer includes, but is not limited to: mapping and navigation; software development and lifecycle management; virtual classroom education delivery; data analytics processing; operation processing; transaction production within the cloud computing environment; and product supply chain management.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope. Accordingly, the scope of protection of this invention is limited only by the claims and their equivalents.

What is claimed is:

1. A method comprising:
   receiving incoming material with an applied first marking, wherein the incoming material is to be converted to at least a portion of a manufactured product, the first marking comprising a unique numeric identifier;
   authenticating, using a server, the first marking of the incoming material;
   scanning, by a scan reader device, unique numeric identifiers on incoming material, wherein the unique numeric identifiers function as a tracking number for the respective incoming material;
   storing, by a manufacturer's data server in communication with a client server database, the unique numeric identifiers via a memory, the unique numeric identifiers scanned using the scan reader device, and linking the unique numeric identifiers to authentication verification and manufacturer side identification;
   physically applying a second marking to the incoming material in response to the authentication, the second marking connected to the first marking;

creating a first relationship between the markings, the first relationship linking the first marking with the second marking in data storage;

converting the received incoming material with the first and second markings to the manufactured product;

creating a second relationship between the first relationship and the manufactured product, wherein the first and second relationships provide traceability of the manufactured product upstream and downstream of a product supply chain;

using the second relationship to identify the incoming material;

linking, via a communication network, the first and the second relationships between two markings that enable traceability of the manufactured product upstream and downstream of the product supply chain; and searching, via a client device, the client server database according to the unique numeric identifiers defined by a finished product including serial numbers, part numbers, supplier codes, manufacturing data codes, and/or anti-counterfeiting authentication codes to increase data retrieval operations of the incoming material associated with the manufactured product and efficiently track and identify the received incoming material.

2. The method of claim 1, wherein authenticating the first marking comprises comparing the first marking to a plurality of source markings, each source marking of the plurality of source markings comprising indicia associated with at least one of a plurality of incoming materials as provided by at least one source of the incoming material.

3. The method of claim 2, further comprising rejecting the incoming material in response to the first marking not matching one of the plurality of source markings.

4. The method of claim 2, further comprising storing first and second relationship data in the client server database for identification of the incoming material associated with the manufactured product.

5. The method of claim 4, further comprising tracking the incoming material along an associated supply chain of the manufactured product by maintaining the first and second relationships throughout the associated supply chain.

6. The method of claim 4, further comprising accessing the stored second relationship data in the database, the stored second relationship data identifying one or more sources associated with the manufactured product.

7. The method of claim 2, wherein authenticating the first marking further comprises evaluating the quality of the incoming material prior to converting the incoming material to the manufactured product.

8. The method of claim 1, wherein the first marking is physical and applied directly to the incoming material.

9. A computer system comprising:
a server in communication with a memory; and
a scan reader device, wherein the server is configured to:
  in response to receiving incoming material with an applied first marking, authenticate the first marking of the incoming material, wherein the incoming material is to be converted to at least a portion of a manufactured product, the first marking comprising a unique numeric identifier;
  store, by a manufacturer's data server in communication with a client server database, the unique numeric identifiers via a memory using the scan reader device and link the unique numeric identifiers to authentication verification and manufacturer side identification;
  receive a scan of a physically applied second marking to the incoming material, wherein the second scan is applied to the incoming material in response to authentication, the second marking connected to the first marking;
  create a first relationship between the markings, the first relationship linking the first marking with the second marking in data storage;
  convert the received incoming material with the first and second markings to the manufactured product;
  create a second relationship between the first relationship and the manufactured product, wherein the first and second relationships provide traceability of the manufactured product upstream and downstream of a product supply chain;
  use the second relationship to identify the incoming material;
  link, via a communication network, the first and the second relationships between two markings that enable traceability of the manufactured product upstream and downstream of the product supply chain; and
  search, via a client device, the client server database according to the unique numeric identifiers defined by a finished product including serial numbers, part numbers, supplier codes, manufacturing data codes, and/or anti-counterfeiting authentication codes to increase data retrieval operations of the incoming material associated with the manufactured product and efficiently track and identify the received incoming material.

10. The computer system of claim 9, wherein authenticating the first marking comprises comparing the first marking to a plurality of source markings, each source marking of the plurality of source markings comprising indicia associated with at least one of a plurality of incoming materials as provided by at least one source of the incoming material.

11. The computer system of claim 10, wherein the server is further configured to reject the incoming material in response to the first marking not matching one of the plurality of source markings.

12. The computer system of claim 10, wherein the server is further configured to store first and second relationship data in the client server database for identification of the incoming material associated with the manufactured product.

13. The computer system of claim 12, wherein the server is further configured to track the received incoming material along an associated supply chain of the manufactured product by maintaining the first and second relationships throughout the associated supply chain.

14. The computer system of claim 12, wherein the server is further configured to access the stored second relationship data in the database, the stored second relationship data identifying one or more sources associated with the manufactured product.

15. A computer program product comprising a non-transitory computer readable storage device having computer readable program code embodied thereon, the computer readable program code configured to be executable by a processor to perform operations comprising:
receiving a scan of a first marking that is applied to incoming material comprising the applied first marking, the incoming material to be converted to at least a portion of a manufactured product, the first marking comprising a unique numeric identifier;
in response to receiving incoming material with an applied first marking, authenticating the first marking of the incoming material, wherein the incoming material is to be converted to at least a portion of a manufactured product, the first marking comprising a unique numeric identifier;

storing, by a manufacturer's data server in communication with a client server database, the unique numeric identifiers via a memory using the scan reader device and link the unique numeric identifiers to authentication verification and manufacturer side identification;

receiving a scan of a physically applied second marking to the incoming material, wherein the second scan is applied to the incoming material in response to authentication, the second marking connected to the first marking;

creating a first relationship between the markings, the first relationship linking the first marking with the second marking in data storage;

converting the received incoming material with the first and second markings to the manufactured product;

creating a second relationship between the first relationship and data regarding the manufactured product, wherein the first and second relationships provide traceability of the manufactured product upstream and downstream of a product supply chain;

using the second relationship to identify the incoming material;

linking, via a communication network, the first and the second relationships between two markings that enable traceability of the manufactured product upstream and downstream of the product supply chain; and searching, via a client device, the client server database according to the unique numeric identifiers defined by a finished product including serial numbers, part numbers, supplier codes, manufacturing data codes, and/or anti-counterfeiting authentication codes to increase data retrieval operations of the incoming material associated with the manufactured product and efficiently track and identify the received incoming material.

16. The computer program product of claim 15, wherein authenticating the first marking comprises comparing the first marking to a plurality of source markings, each source marking of the plurality of source markings comprising indicia associated with at least one of a plurality of incoming materials as provided by at least one source of the incoming material.

17. The computer program product of claim 16, wherein the operations further comprise rejecting the incoming material in response to the first marking not matching one of the plurality of source markings.

18. The computer program product of claim 16, wherein the operations further comprise storing first and second relationship data in the client server database for identification of the incoming material associated with the manufactured product.

19. The computer program product of claim 18, wherein the operations further comprise tracking the received incoming material along an associated supply chain of the manufactured product by maintaining the first and second relationships through the associated supply chain.

20. The computer program product of claim 18, wherein the operations further comprise accessing the stored second relationship data in the database, the stored relationship data identifying one or more sources associated with the manufactured product.

* * * * *